United States Patent [19]

Weber

[11] 4,036,377
[45] July 19, 1977

[54] DEVICE FOR TRANSPORTING LOADS, ESPECIALLY FOR BELT DRIVING STATIONS IN OPEN PIT MINING

[75] Inventor: Heinz Weber, Krefeld-Traar, Germany

[73] Assignee: Fried. Krupp Gesellschaft mit beschrankter Haftung, Essen, Germany

[21] Appl. No.: 562,487

[22] Filed: Mar. 27, 1975

[30] Foreign Application Priority Data

Apr. 5, 1974 Germany .............................. 2416642

[51] Int. Cl.² ............................................... B60P 1/02
[52] U.S. Cl. .................................... 214/512; 180/116; 254/87
[58] Field of Search ................. 214/512, 1 D; 254/87, 254/2, 93 VA; 187/8.47; 180/116, 122

[56] References Cited

U.S. PATENT DOCUMENTS

| | | | |
|---|---|---|---|
| 3,189,115 | 6/1965 | Rethorst | 180/116 X |
| 3,612,312 | 10/1971 | Behrmann | 214/512 X |
| 3,715,101 | 2/1973 | Puhringer | 254/87 |
| 3,783,976 | 1/1974 | Kerr | 187/8.47 X |
| 3,918,682 | 11/1975 | Despalmes | 254/87 |

Primary Examiner—Albert J. Makay
Attorney, Agent, or Firm—Walter Becker

[57] ABSTRACT

A device for transporting loads, especially for moving belt driving stations in open pit mining operations with a propelling mechanism which for lifting a respective load is operable to move into a free space formed by said load with the ground. The device comprises a plurality of lifting mechanisms, by means of which, a lifting platform can be brought into engagement with a supporting surface of the load. The device comprises at least one supporting member which is so designed that it prevents the lifting platform from lifting off lifting mechanisms. Furthermore, means are provided which permit a turning of the lifting platform relative to the lifting mechanisms about a vertical axis which is arranged in a certain relationship to the propelling mechanism.

6 Claims, 8 Drawing Figures

FIG. 5

DEVICE FOR TRANSPORTING LOADS, ESPECIALLY FOR BELT DRIVING STATIONS IN OPEN PIT MINING

The present invention relates to a device for transporting load, especially for moving belt driving stations in open pit mining, with a propelling mechanism which for lifting a load is able to move into a free chamber formed by the load relative to the ground and which has a plurality of hoisting means by means of which a lifting platform can be caused to engage a supporting surface for the load which limits the free chamber at the top.

It is an object of the present invention so to design a device of the above mentioned general type that the heavy load or weight is with a most favorable position of the center of gravity secured relative to the propelling mechanism supporting said load or weight and is also secured against tipping off from the vehicle.

These and other objects and advantages of the invention will appear more clearly from the following specification in connection with the accompanying drawings, in which:

The device according to the invention for transporting loads, is characterized primarily in that at least one supporting member is so designed that it prevents the lifting platform from lifting off from the lifting mechanisms, and is furthermore characterized in that means are provided which permit a turning of the lifting platform relative to the lifting mechanisms about a vertical axis which is arranged in a certain way relative to the propelling mechanism. For instance such suporting member is displaceably guided in vertical direction relative to a guiding body which is approximately at the center of the chamber defined by the lifting mechanism arranged on the propelling mechanism. Such supporting member is furthermore adjustable at various levels relative to said guiding body while the upper end of the supporting member is connected with the lifting platform by means of a joint. This joint permits rotary movements of the propelling mechanism relative to the lifting platform firmly connected to the load, about a vertical axis and permits tilting movements of the lifting platform and of the load. Said joint is adapted to transmit pulling forces from the lifting platform to the supporting member. For arresting this supporting member relative to the guiding body there is preferably provided a frictionally acting clamping device. However, it is also possible that the supporting members which prevent a lifting of the lifting platform from the lifting mechanisms are formed by the parts of the lifting mechanisms which are adjustable as to height, in such a way that the upper ends of said parts are connected to a lower platform by means of joints which are able to transmit pulling forces from the lower platform to the parts of the lifting mechanisms which parts are adjustable as to height. The lifting platform is mounted on the lower platform by means of a turntable which turntable is also able to transmit pulling forces from the lifting platform to the lower platform.

Figure 1:
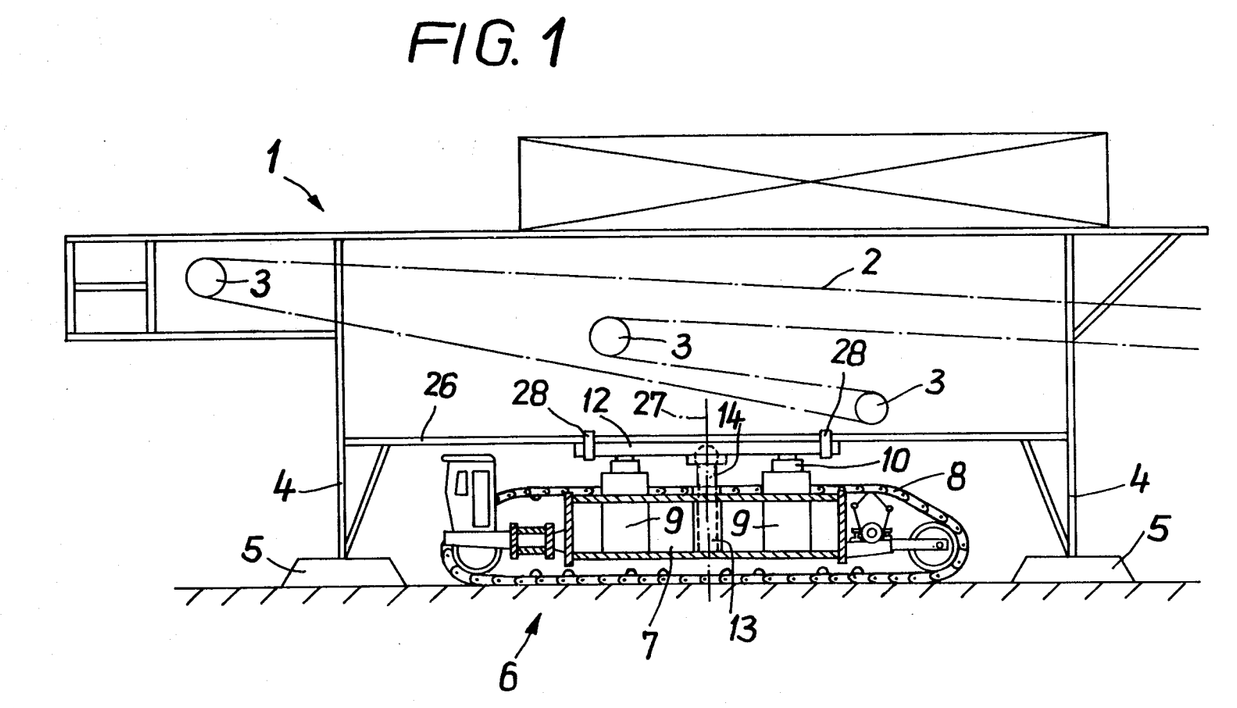
FIG. 1 diagrammatically illustrates in side view a first embodiment of a propelling mechanism and a belt driving station to be transported thereby.
Figures 2, 2A:
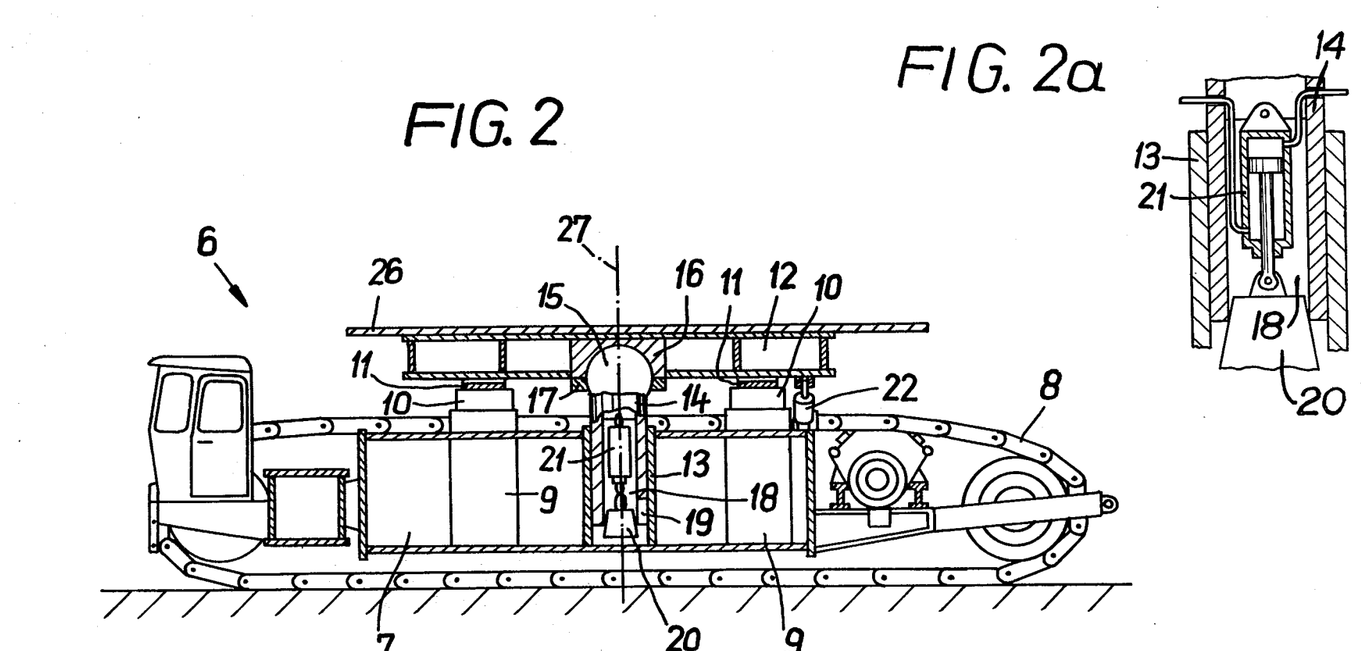
FIG. 2 shows on a somewhat larger scale than FIG. 1 the same propelling mechanism as the latter but in a vertical longitudinal central section.
FIG. 2a shows a hydraulic latch for securing the lifting platform.
Figure 4:
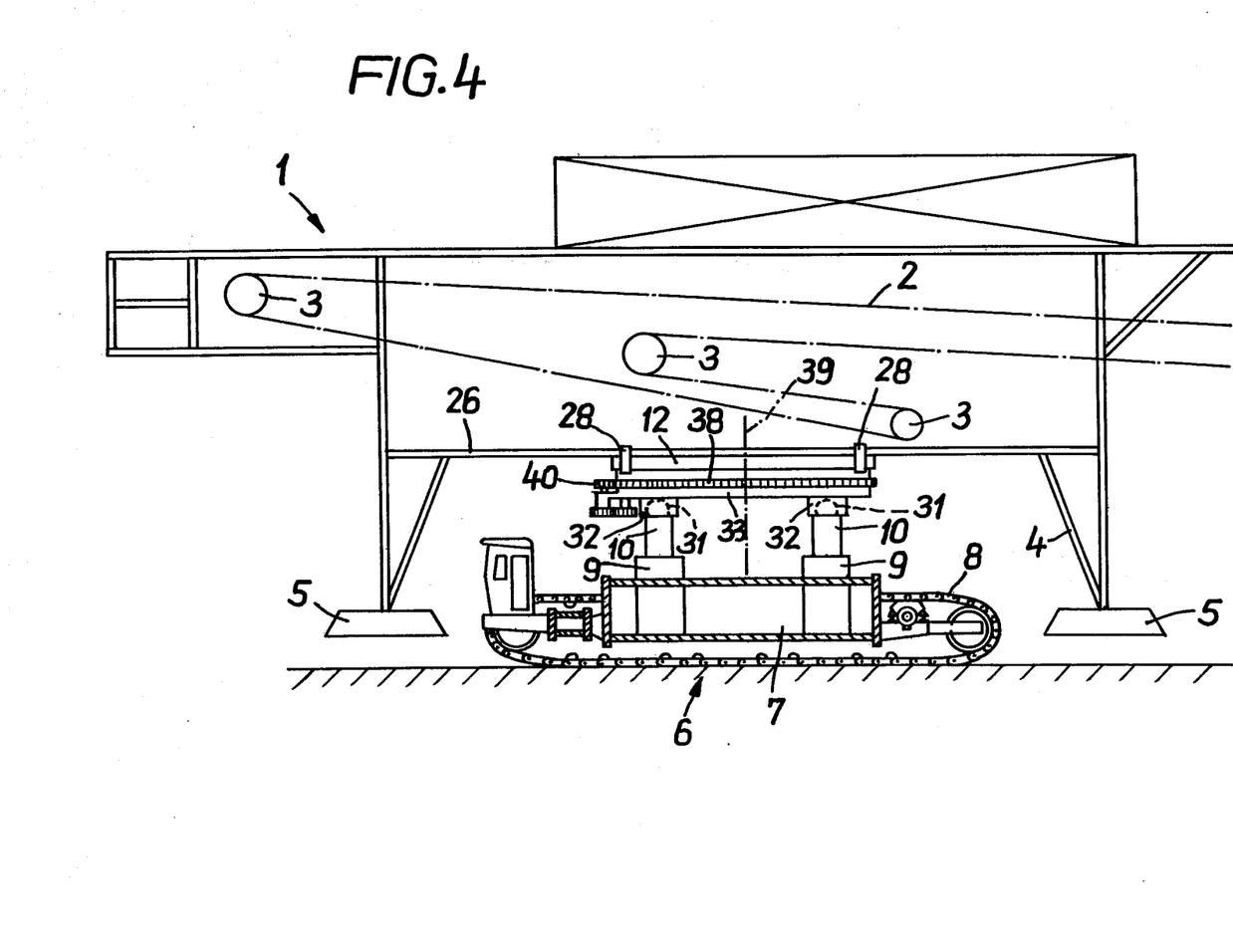
FIG. 4 is a side view of a propelling mechanism and of a belt driving station carried thereby, FIG. 4 representing a side view of a second embodiment of the invention.
Figure 6:
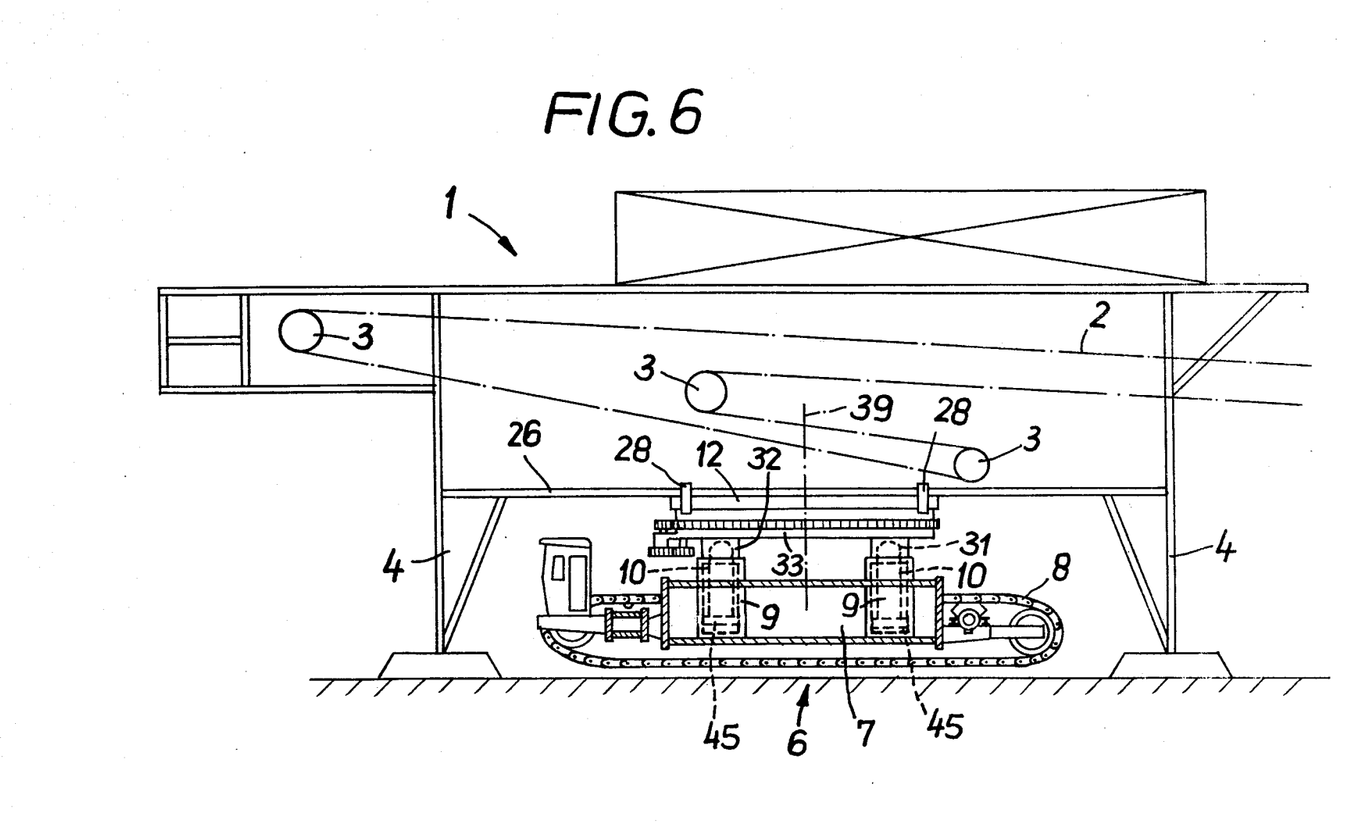
FIG. 6 illustrates the same propelling mechanism and the same belt driving station as in FIG. 4 but in a side view and in another condition of operation.

Referring now to the drawings in detail, the belt driving station 1 which is shown in FIG. 1 and with somewhat higher supports in FIGS. 4 and 6 forms a component of a relatively long conveyor belt arrangement. The conveyor belt 2 is within the belt driving station 1 guided in a loop over three drums 3. The framework of the belt driving station which includes said drums has legs 4 with footplates 5 provided at four corners.

The propelling mechanism 6 according to the first embodiment of the invention has a carrier 7 for the propelling mechanism while on both sides of said carrier 7 there are guided two caterpillar chains 8. These chains 8 may be driven at various speeds and may selectively be operated in the same direction or in opposite directions.

Provided in the carrier 7 are four cylinders 9 of hydraulic lifting mechanisms with vertical axes. The arrangement is such that the axes of cylinder 9 when viewed in bottom view form the corners of a square. In the cylinders 9, pistons 10 are guided which have their upper ends provided with supporting plates 11. A lifting platform 12 rests on the four plates 11.

In the chamber which is defined by the four cylinders 9, in the central area there is in the carrier 7 provided a further cylinder 13 with a vertical axis. In this cylinder there is displaceably guided a pivot 14 which forms the supporting member. Pivot 14 has its upper end provided with a ball head 15. This ball head 15 is partially surrounded and engaged at its upper portion by a ball socket 16 which extends downwardly to a horizontal plane passing through the center of a sperical surface which forms a portion of the ball head. The socket 16 is connected within the lifting platform 12. Connected to the ball socket 16 at the bottom side thereof is a ring 17 which by means of a spherical surface of a ball section surrounds the lower part of a ball head 15.

The pivot 14 has a bore 18 and has its lower portion provided with slots 19. From below and partially into the bore 18 there extends a spreading wedge 20 which tapers in upward direction. A hydraulic lifting device 21 arranged in the bore 18 has the upper end of its cylinder connected to the pivot 14 and has its lower end of its connecting rod connected to the spreading wedge 20.

The carrier 7 for the propelling mechanism is furthermore through two hydraulic power means connected to the lifting platform 12. The cylinders 22 of said hydraulic power operable devices are connected to two corners of the carrier 7 in joints 23. The connecting rods 24 of these hydraulic power operable devices are pivotally connected to a holding member 25. The holding member 24 is mounted on the lifting platform 12 at the bottom side thereof while being located at the central longitudinal section of the lifting platform 12 and on a rim portion of the lifting portion 12. The arrangement is such that in its starting position of the lifting platform, the center lines of the two hydraulic power operable devices 22, 24, form with the connecting line of the centers of the joints 23 an isosceles triangle.

FIG. 1 shows that the propelling mechanism is moved directly into the free space which is located between the four legs 4 and at its upper end is confined by a horizontal wall of 26 of the framework of the belt driving station. The propelling mechanism occupies such a position that the vertical central line 27 of the pivot 14 at least approximately passes through the center of gravity of the belt driving station 1. The lifting platform 12 is by means of the hydraulic lifting mechanism 9, 10 lifted to such an extent that it engages the lower side of wall 26 of the framework of the belt driving station. The lifting movement of the lifting platform 12 is followed by the pivot 14 inasmuch as the latter is carried along by the ring 17 which catches below the ball head 15. In this position, the pivot 14 is arrested by the fact that the spreading wedge 20 is by means of the hydraulic lifting device 21 pulled upwardly as far as possible so that consequently the lower end of the pivot 14 which is made yieldable by the slots 19 is pressed against the inner surface of the cylinder 13. Due to this frictional connection, the lifting platform 12 is held in the described position when subsequently the pistons 10 of the lifting mechanisms are moved downwardly. The propelling mechanism can then be turned about the vertical center line 27 relative to the belt driving station 1 standing with its footplates 5 on the ground. This can be effected by driving the two chains 8 in a direction opposite to each other. Thus, the propelling mechanism can be aligned relative to the belt driving station with regard to the transporting device.

Figure 3:
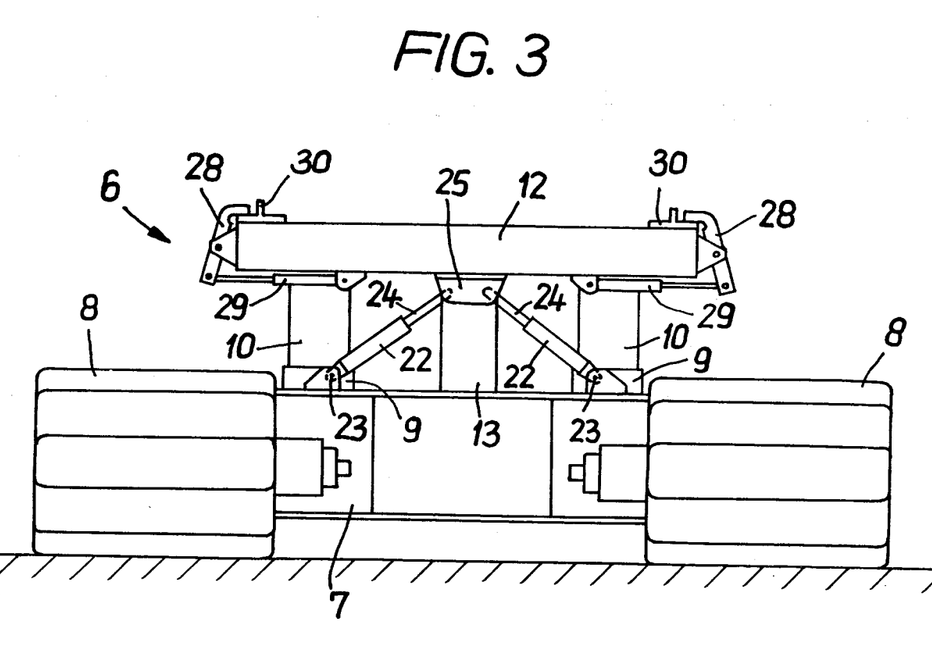
FIG. 3 shows an end view of the propelling mechanism according to FIG. 2.

When this has been effected, the pistons of the four lifting mechanisms are moved again upwardly after the spreading wedge 20 has been released, in other words after the frictional connection between the pivot 14 and the cylinder 19 has been made ineffective. By means of the lifting mchanisms 9, 10, the lifting platform 12 is lifted together with the belt driving station, 1. Previously thereto, the belt driving station 1 was fixedly coupled to the lifting platform 12. This was effected by means of two arm levers 28 (FIG. 3) which in pairs were pivotally mounted on the lifting platform 12 at those sides which are located opposite to each other. The connecting rods of two hydraulic adjusting devices engage downwardly extending arms of said levers 28. The cylinders 29 of said hydraulic adjusting devices are in a horizontal arrangement pivotally connected to the lifting platform 12 on the bottom side thereof. The upwardly extending arms of the levers 28 have their hook-shaped ends extend over flanges of I-beams 30 which are located on the lifting platform 12 and which form the main components of the horizontally extending wall 26 of the framework of the belt driving station 1.

If thus the footplates 5 are lifted off the ground, the belt driving station 1 can by means of the propelling mechanism 6 be moved to its place of destination. In this connection there does not exist the danger that the lifting platform 12 due to tipping oscillations of the belt driving station 1 fixedly connected thereto is lifted off the bearing plates 11 of two lifting mechanisms 9, 10, whereby the transport would otherwise be endangered. It will be appreciated that such lifting off is prevented by the pivot 14 because the latter, prior to the start of the driving movement is by tightening the spreading wedge 20 firmly connected to the cylinder 13 so that the pivot 14 through the intervention of the ring 17 extending below around the ball head 15 will be able to transmit pulling forces from the lifting platform 12 to the propelling mechanism carrier or beam 7. The pivot 14 connected to the cylinder 13 is furthermore of importance also for the reason that if, due to a leakage occurring in a pressure fluid conduit, the lifting mechanisms 9, 10 would become ineffective, the frictional connection between the pivot 14 and the cylinder 13 will act as friction brake and therefore will prevent that in case of failure of the pressure fluid, the lifted belt driving station 1 will shock-like set down onto the ground. When in the above mentioned manner the belt driving station 1 is lifted off the ground, the hydraulic power operable devices 22, 24 will when the conduits connected to the cylinders 22 are blocked prevent the lifting platform 12 with the belt driving station 1 from turning around the vertical center line 27 of the cylinder 13. On the other hand, by means of the hydraulically operable power operated devices 22, 24, the lifting platform 12 together with the belt driving station 1 will be able to turn within the region of a certain angle relative to the propelling mechanism 6 about the vertical center line 27 in order to align the same relative to the propelling mechanism in a manner suitable for the transport. This is effected inasmuch as simultaneously the connecting rod 24 of one of the two hydraulic power operated devices moves out of the respective cylinder 22, and the connecting rod 24 of the other power operated device is moved into the pertaining cylinder 22.

Figure 5:
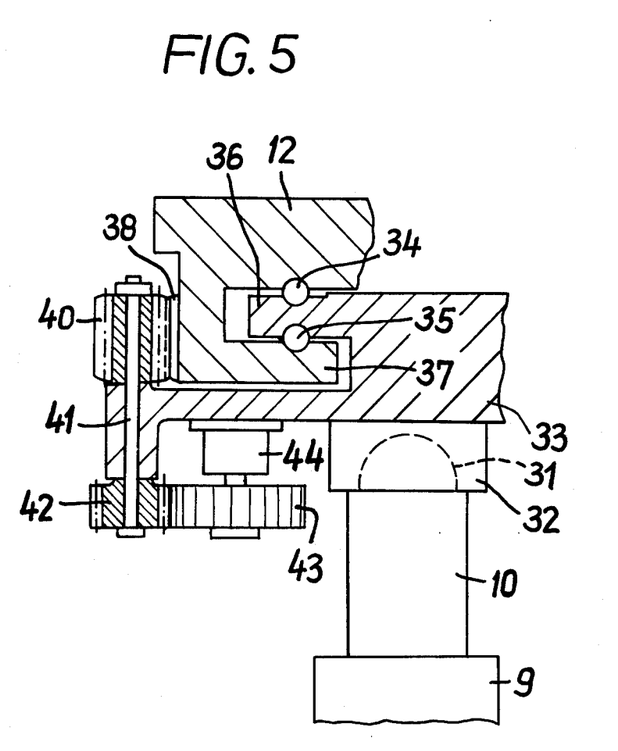
FIG. 5 shows a detail of FIG. 4 in section but on a larger scale than FIG. 4.

While the embodiment according to FIGS. 4, 5 and 6, the pivot 14 has been omitted. The piston of the hydraulic lifting mechanisms 9, 10 have their upper ends provided with ball heads 31 engaged from above by ball sockets 32 in such a manner that by said pistons in vertical direction downwardly as well as upwardly directed forces can be transmitted to the pistons 10. The ball sockets 32 are located on a lower platform 33 at the bottom side thereof. The lower platform 33 is connected to the lifting platform 12 in the manner shown in FIG. 5 in such a way that the lifting platform 12 will be able to transmit in vertical direction onto the lower platform 33 forces which are directed downwardly as well as upwardly. This is brought about by means of two ball rings 34, 35 which are arranged between an annular flange 36 and the lifting platform 12 and between the flange 36 and an annular flange of the platform 12 extending from below around the flange 36. Mounted on the main platform 12 is a gear ring 36 the center line 39 of which extends vertically in the middle of the chamber which is surrounded by the lifting mechanisms 9, 10. Pinion 40 meshes with the gear 38 and is by means of a vertical shaft 41 mounted on an arm of the lower plate 33. The shaft 41 is through gears 42, 43 driven by an electric motor 44 which is mounted on the bottom side of the lower plate 33.

FIG. 4 shows that the driving mechanism 6 has been moved into the free space between the legs 4 of the framework of the belt driving station, and that by lifting the lower plate 33 and the lifting platform 12 by means of the lifting mechanisms 9, 10, the belt driving station 1 is lifted off the ground. In this connection, the lifting platform 12 may together with the belt driving station 1, the framework of which is in the same manner as with the first embodiment fixedly connected to the lifting platform by two arm levers 28, be turned about the vertical center line relative to the propelling mechanism 6 by means of the motor 44 and the gear transmission 43, 42; 40, 38. In this way, the lifted belt driving station 1 can be aligned relative to the propelling mechanism 6 in the manner desired for the transport of the belt driving station.

As will be evident from FIG. 6, it is also possible that the propelling mechanism 6 will be lifted off the ground whereas the belt driving station 1 is resting on the ground. This is brought about by moving the pistons 10 of the lifting mechanisms into the cylinders 9 provided, of course, that the pistons 10 are double acting pistons. To this end, as indicated in FIG. 6 by dash lines, the pistons 10 are stepped in such a way that their lower ends form discs 45, the diameters of which equal the inner diameter 9 and are greater than the diameter of the piston 10. Due to the fact that into the annular spaces which pertain to the cylinder 9 and are located above the discs 45, pressure fluid is introduced and that fluid is discharged from the cylinder chambers above the discs, the cylinders 9 and together therewith the propelling mechanism 6 is lifted relative to the pistons 10 which are suspended on the lower plate 33 by means of the ball heads 31 and ball sockets 32. By turning the propelling mechanism 6 about the vertical center line 39, which propelling mechanism is according to FIG. 6 suspended above the ground, the propelling mechanism can relative to the belt driving station standing on the ground be so rotated that the desired alignment of the propelling mechanism can be effected in conformity with the direction of the transport.

Also this embodiment will avoid that the belt driving station 1 when it is lifted off the ground in conformity with FIG. 4, can tip from the upper end of piston 10 in any direction. It will be appreciated that this is prevented by the ball sockets 32 which, as mentioned above, surround the ball heads 31 in such a way that forces acting in upward direction are by the ball sockets 32 conveyed to the pistons 10.

Due to the ball joint connection 31, 32 between the pistons 10 and the lower plate 33, the belt driving station 1 can during the transport, when the propelling mechanism 6 moves on an inclined terrain be so aligned that the wall 26 of the framework of the belt driving station 1 remains horizontal.

Also with the embodiment according to FIGS. 4, 5 and 6, the belt driving station 1 is possibly connected to the lifting platform 12 in such a way that the vertical center line 39 extends at least approximately through the center of gravity of the belt driving station. Whether this arrangement has been realized can easily be ascertained with both embodiments by measuring the fluid pressures in the cylinders 9 and comparing the measured values with each other. These fluid pressures differ from each other when the center of gravity of the belt driving station 1 is located outside the vertical center line 9 which in its turn extends through the center point of the square, the corners of which are defined by the center lines of the cylinders 9.

Figure 7:
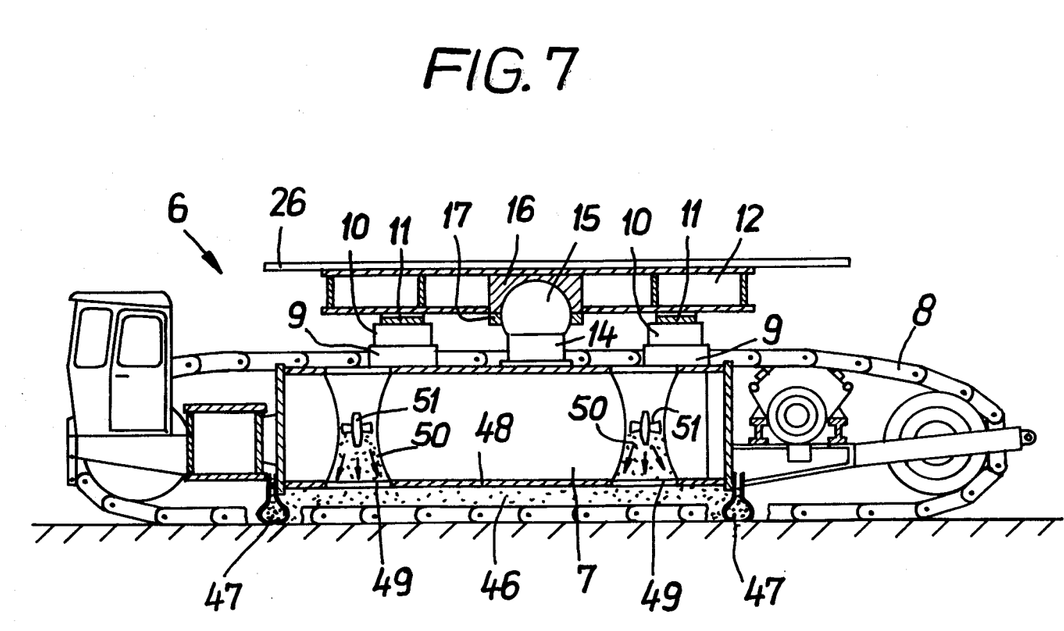
FIG. 7 shows a propelling mechanism according to FIG. 2 along a vertical longitudinal section with an additional device.

In order to be able, also when the driving mechanism 6 is under a high load by a particularly large load body, for instance a particularly large belt drive station, to hold the specific ground pressure below the caterpillar chains 8, within the permissible limits without the chains 8 having to be designed with an undesired wide width, it is possible below the carrier 7 for the propelling mechanism, to create an air cushion between the chains 8. As will be seen from FIG. 7, this air cushion 46 is on all sides closed off for instance by hollow sealing beads 47 of rubber which are by compressed air in the interior thereof pressed against the ground. The air cushion is closed toward the top by a horizontal wall 48 of the carrier 7 for the propelling mechanism. Air under pressure is through nozzles 50 with axial vents 51 therein pressed into the air cushion 46. A portion of the weight of the propelling mechanism 6 and the load body supported thereby is absorbed by the over-pressure in the air cushion 46 so that the chains 8 will be relieved.

It is also possible to equip the propelling mechanism 6 with any desired working devices as for instance planing blades or the like so that the propelling mechanism can be used for other purposes when it is not required for transporting a belt driving station or the like. Inasmuch as the propelling mechanism after having transported for instance a belt driving station 1 to a desired place for instance an open pit mining site, can easily be separated from the belt driving station after the latter has been placed onto the ground, one and the same propelling mechanism can be used for transporting a plurality of belt driving stations or similar heavy load bodies.

It is, of course, to be understood, that the present invention is, by no means, limited to the specific showing in the drawings, but also comprises any modifications within the scope of the appended claims.

What I claim is:

1. A device for lifting and transporting loads, especially for moving belt driving stations in open pit mining, which includes: caterpillar chain carrying means, propelling means associated with said carrying means for propelling same, a plurality of supporting means comprising in combination fluid operable cylinder-piston means with their axes extending upwardly substantially perpendicularly with regard to said carrying means, lifting plaftform means arranged above said supporting means for selectively supporting a load means associated with at least one of said supporting means and connecting the latter to at least one of said supporting means, and means associated with said lifting platform for permitting independent turning of said lifting platform and said propelling means relative to each other, said means associated with said lifting platform including additional fluid operable cylinder-piston means and latch means interconnecting said lifting platform and said carrying means, said additional fluid operable cylinder-piston means being inclined relative to each other so that the forces generated thereby have components tending to create rotary movements about a common vertical axis, whereby the lift platform can be rotated or when the latch means is actuated the carrying means can be rotated relative to the lifting platform means.

2. A device in combination according to claim 1, in which said means associated with said lifting platform includes a ball joint connected to said carrying means and rotatably connected to said lifting platform.

3. A device in combination according to claim 1, which includes guiding means fixedly connected to said carrying means and associated with said at least one of said supporting means, said latch means including a frictional locking means associated with said at least one of said supporting means and said guiding means for selectively preventing a turning movement of said lifting platform means relative to said carrying means.

4. A device in combination according to claim 1, in which said propelling means includes track laying means, and which includes inflatable cushion means below said carrying means and between said track laying means.

5. A device for lifting and transporting loads, especially for moving belt driving station in open pit mining, which includes in combination: caterpillar chain carrying means, propelling means associated with said carrying means for propelling same, a plurality of fluid operable cylinder-piston systems supported by said carrying means and arranged in axially spaced relationship to each other with their axes extending upwardly substantially perpendicularly with regard to said carrying means, pivot means arranged in an area between said fluid operable cylinder-piston systems and supported by said supporting means while being reciprocable in a direction substantially parallel to said cylinder-piston systems, lifting platform means connected to said pivot means and pivotally engaged thereby, said cylinder-piston systems being operable selectively to lift and support said platform means independently of the propelling means, and locking means associated with said pivot means for selectively locking the same at a desired height whereby the lift platform can be rotated or when the locking means is actuated the carrying means can be rotated relative to the lifting platform means.

6. A device according to claim 5, which includes a turntable and an auxiliary platform supporting said lifting platform by means of said turntable, said turntable being operable to transmit forces exerted thereupon to said lifting platform, and join means connecting said auxiliary platform to said fluid operable cylinder-piston means of said supporting means, and adapted to transmit upwardly directed forces to said fluid operable cylinder-piston means.

* * * * *